United States Patent
Takayanagi et al.

(10) Patent No.: US 7,510,040 B2
(45) Date of Patent: Mar. 31, 2009

(54) MOTORCYCLE

(75) Inventors: Shinji Takayanagi, Saitama (JP); Osamu Suzuki, Saitama (JP); Yukinori Kurakawa, Saitama (JP); Futoshi Miyakawa, Saitama (JP); Naoki Inoue, Saitama (JP); Yukiya Ueda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 186 days.

(21) Appl. No.: 11/528,660

(22) Filed: Sep. 28, 2006

(65) Prior Publication Data

US 2007/0095591 A1 May 3, 2007

(30) Foreign Application Priority Data

Sep. 29, 2005 (JP) ............................. 2005-285313

(51) Int. Cl.
*B62M 17/00* (2006.01)
(52) U.S. Cl. ..................................................... 180/226
(58) Field of Classification Search ................. 180/226
See application file for complete search history.

(56) References Cited

U.S. PATENT DOCUMENTS

| | | | | |
|---|---|---|---|---|
| 4,436,173 A * | 3/1984 | Takahashi | ................ | 180/226 |
| 4,857,032 A * | 8/1989 | Aiki et al. | ................ | 464/68.92 |
| 5,067,580 A * | 11/1991 | Parker | ................ | 180/219 |
| 5,263,549 A * | 11/1993 | Dick | ................ | 180/226 |
| 6,073,719 A * | 6/2000 | Ohmika et al. | ................ | 180/219 |
| 6,439,592 B1 * | 8/2002 | Christini et al. | ................ | 280/230 |
| 6,516,912 B2 | 2/2003 | Iwai et al. | | |
| 6,793,030 B2 * | 9/2004 | Pyykonen | ................ | 180/182 |
| 6,923,293 B1 * | 8/2005 | James | ................ | 188/18 A |
| 7,204,624 B2 * | 4/2007 | Katagiri | ................ | 362/475 |
| 7,362,278 B2 * | 4/2008 | Funayose | ................ | 343/711 |
| 7,419,028 B2 * | 9/2008 | Yamakura et al. | ................ | 180/291 |
| 7,438,040 B2 * | 10/2008 | Sugita et al. | ................ | 123/195 R |
| 7,438,149 B2 * | 10/2008 | Ishida et al. | ................ | 180/227 |
| 2005/0122729 A1 | 6/2005 | Katagiri | | |
| 2007/0062752 A1 * | 3/2007 | Sugita et al. | ................ | 180/309 |
| 2007/0076421 A1 * | 4/2007 | Kogo et al. | ................ | 362/540 |
| 2007/0199756 A1 * | 8/2007 | Kofuji | ................ | 180/226 |

FOREIGN PATENT DOCUMENTS

| | | |
|---|---|---|
| DE | 805 119 C | 5/1951 |
| DE | 25 46 804 A1 | 4/1977 |

(Continued)

*Primary Examiner*—Paul N Dickson
*Assistant Examiner*—Patrick Centolanzi
(74) *Attorney, Agent, or Firm*—Birch, Stewart, Kolasch & Birch, LLP

(57) ABSTRACT

A power transmission mechanism of a motorcycle includes a drive case which is disposed at the rear end of and outside of a rear swing arm, and which surrounds the axle of a rear wheel and incorporates a transmission device. In addition, the power transmission mechanism includes a drive shaft extending from an output shaft of an engine for transmitting power of the drive shaft to the rear wheel. The transmission device converts the direction of a driving force of the drive shaft and transmits it to the rear wheel. The drive shaft constituting part of the power transmission mechanism is disposed below the rear swing arm and the pivot shaft. The result is a motorcycle configuration that suppresses the vehicle width without expanding the rear swing arm.

20 Claims, 5 Drawing Sheets

FOREIGN PATENT DOCUMENTS

| | | |
|---|---|---|
| DE | 26 16 101 A1 | 10/1977 |
| DE | 101 08 770 A1 | 9/2001 |
| EP | 1 361 149 A1 | 11/2003 |
| FR | 509852 | 11/1920 |
| JP | 64-85888 A | 3/1989 |
| JP | 2002-079982 A | 3/2002 |
| JP | 2007091123 A * | 4/2007 |

* cited by examiner

MOTORCYCLE

CROSS-REFERENCE TO RELATED APPLICATION

The present application claims priority under 35 U.S.C. §119 to Japanese Patent Application No. 2005-285313, filed Sep. 29, 2005, the entire contents of which are hereby incorporated by reference.

BACKGROUND OF THE INVENTION

1. Field of the Invention

The present invention is relates to a motorcycle provided with a power transmission mechanism including a drive shaft which transmits a driving force to a rear wheel from an engine.

2. Description of Background Art

A motorcycle is known which includes a rear swing arm swingably attached to a body frame via a pivot shaft, an engine secured to the body frame, and a power transmission mechanism including a drive shaft which transmits a driving force from the engine to a rear wheel (e.g., refer to Japanese Patent Laid-open No. 2002-79982 (FIG. 3).

In FIG. 3 of Japanese Patent Laid-open No. 2002-79982, a power transmission mechanism is configured as follows. A bevel output shaft 106 is provided at the rear part of a power unit 21. A drive shaft 118 is connected to the bevel output shaft 106 via a universal joint 117. A starter clutch 120 is coupled to the rear end of the drive shaft 118 and a bevel mechanism 119 is coupled to the rear end of the starter clutch 120. A rear wheel 18 is connected to the bevel mechanism 119. In this way, the driving force of the power unit 21 is transmitted to the rear wheel 18.

A swing transmission unit 19 incorporates a power transmission mechanism including the drive shaft 118, and also combines a rear swing arm with a case for housing the power transmission mechanism. In addition, the swing transmission unit 19 is attached to the rear portion of the body frame 2 via a pivot shaft 17.

When the drive shaft 118 is allowed to pass through the inside of the swing transmission unit 19, a reinforcing rib is provided between the swing transmission unit 19 and the pivot shaft 17 or the swing transmission unit 19 is increased in thickness, thereby ensuring the predetermined rigidity as the rear swing arm. Thus, the swing transmission unit 19 tends to expand in volume.

If the swing transmitting unit 19 expands in volume, there are limits to the extent that the width of the vehicle can be suppressed.

A technique is therefore required which can suppress the width of the vehicle without expanding the volume of the swing transmission unit 19 (hereunder refer to as a rear swing arm).

SUMMARY AND OBJECTS OF THE INVENTION

It is an object of the present invention to provide a motorcycle capable of suppressing the width of the vehicle without expanding the volume of a rear swing arm.

According to a first aspect of the present invention, a motorcycle includes a body frame, a rear swing arm swingably attached to the body frame via a pivot shaft, an engine secured to the body frame, and a power transmission mechanism including a drive shaft which transmits a driving force from the engine to a rear wheel. The drive shaft is disposed below the rear swing arm and the pivot shaft.

According to a second aspect of the present invention, a motorcycle includes a body frame, a rear swing arm swingably attached to the body frame via a pivot shaft, an engine secured to the body frame, and a power transmission mechanism including a drive shaft which transmits a driving force from the engine to a rear wheel. The drive shaft extends outside the body frame, the rear swing arm is attached to the inside of the body frame, and the drive shaft is disposed at a position offset from the pivot shaft in the up and down direction as viewed from the side.

According to a third aspect of the present invention, the rear swing arm is a bent frame being projected upwardly.

According to a fourth aspect of the present invention, the engine is disposed below a leg-passing space adapted to pass a rider's leg therethrough when a rider mounts on or dismounts from the motorcycle.

According to a fifth aspect of the present invention, a motorcycle includes a body frame, a rear swing arm swingably attached to the body frame via a pivot shaft, an engine secured to the body frame, and a power transmission mechanism which transmits a driving force from the engine to a rear wheel via a drive shaft and a damping device. A drive case incorporating a transmission mechanism is provided at a rear end of the rear swing arm. The transmission mechanism converts a direction of a driving force of the drive shaft and transmits the driving force to the rear wheel. The damping device which alleviates a shock applied to the rear wheel is provided in the drive case, and a damping member is provided in the damping device so as to be coaxial to an axle of the rear wheel.

According to a sixth aspect of the present invention, a universal joint capable of sliding forward and rearward is provided on the way of the drive shaft, and a cover covering the universal joint is extended forward from the drive case.

According to a seventh aspect of the present invention, the drive shaft extends through a space enclosed by the body frame, a step floor on which a driver's foot is placed, and an under cover merging into the step floor and extending below the step floor.

Effects of the Invention

In the first aspect of the present invention, the drive shaft is disposed below the rear swing arm and the pivot shaft.

If the drive shaft is disposed on the side of the pivot shaft, then a width is necessary which results from adding at least the outside diameter of the drive shaft to the length of the pivot shaft, whereby the width of the vehicle may possibly be increased.

In regard to this point, since the drive shaft is disposed below the pivot shaft in the present invention, the drive shaft and the pivot shaft can be disposed to overlap one above the other as viewed from above. If the drive shaft and the pivot shaft are disposed to overlap one above the other, then the width of the rear swing arm can be minimized. If the width of the rear swing arm can be minimized, then the width of the vehicle can be minimized.

In addition, since the drive shaft is disposed below the rear swing arm, the power take-out section can be disposed below the rear swing arm. Since the power take-out section is disposed below the rear swing arm, the engine can be disposed at the lower portion of the vehicle, which makes it possible to lower the center of gravity of the vehicle.

The lowered center of gravity of the vehicle can enhance drivability during high-speed traveling.

In the second aspect of the present invention, the drive shaft extends outside the body frame, the rear swing arm is attached to the inside of the body frame, and the drive shaft is disposed at a position offset from the pivot shaft upward and downward as viewed from the side. Therefore, the width of the vehicle can be minimized, and in addition, the degree of freedom of designing the body frame can be increased.

Additionally, since the position of the drive shaft is displaced upward or downward, the engine can be located at the optimum position.

In the third aspect of the present invention, since the rear swing arm is a bent arm being projected upward, it is facilitated to enhance the bending rigidity of the rear swing arm. In addition, since the rear swing arm is curved, it can be enhanced in the external appearance thereof.

In the fourth aspect of the present invention, the engine is disposed below a leg-passing space adapted to pass a rider's leg therethrough when a rider mounts on or dismounts from the motorcycle. Therefore, the engine can be disposed at the lower portion of the vehicle, i.e., at a lower position. Since the engine is disposed at the lower portion of the vehicle, i.e., at a lower position, it is possible to lower the center of gravity of the vehicle. Besides, since the broad leg-passing space can be ensured, rider's mounting/dismounting performance can be enhanced.

In the fifth aspect of the present invention, since the transmission device and the damping device are incorporated in the drive case, they can be assembled in a single chamber. For instance, it is not necessary to provide a partition wall between the transmission device and the damping device so as to separate them.

When the damping member is provided for the damping device so as to be coaxial with the axle of the rear wheel, if the partition wall is not necessary to separate the transmission device from the damping device, then the axle of the rear wheel can be reduced in length. If the axle of the rear wheel can be reduced in length, the width of the vehicle can be minimized.

In addition, the shaft case can be further reduced in size as compared to when the damping member is provided at the shaft case covering the drive shaft.

In the sixth aspect of the present invention, a universal joint capable of sliding forward and rearward is provided on the way of the drive shaft, and a cover covering the universal joint is extended forward from the drive case. Therefore, the universal joint can be protected and external appearance can be enhanced.

In the seventh aspect of the present invention, the drive shaft extends through a space enclosed by the body frame, a step floor, and an under cover extending below the step floor. Therefore, while a space adapted to place a rider's foot thereon can be ensured, another space below the space can be utilized effectively.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
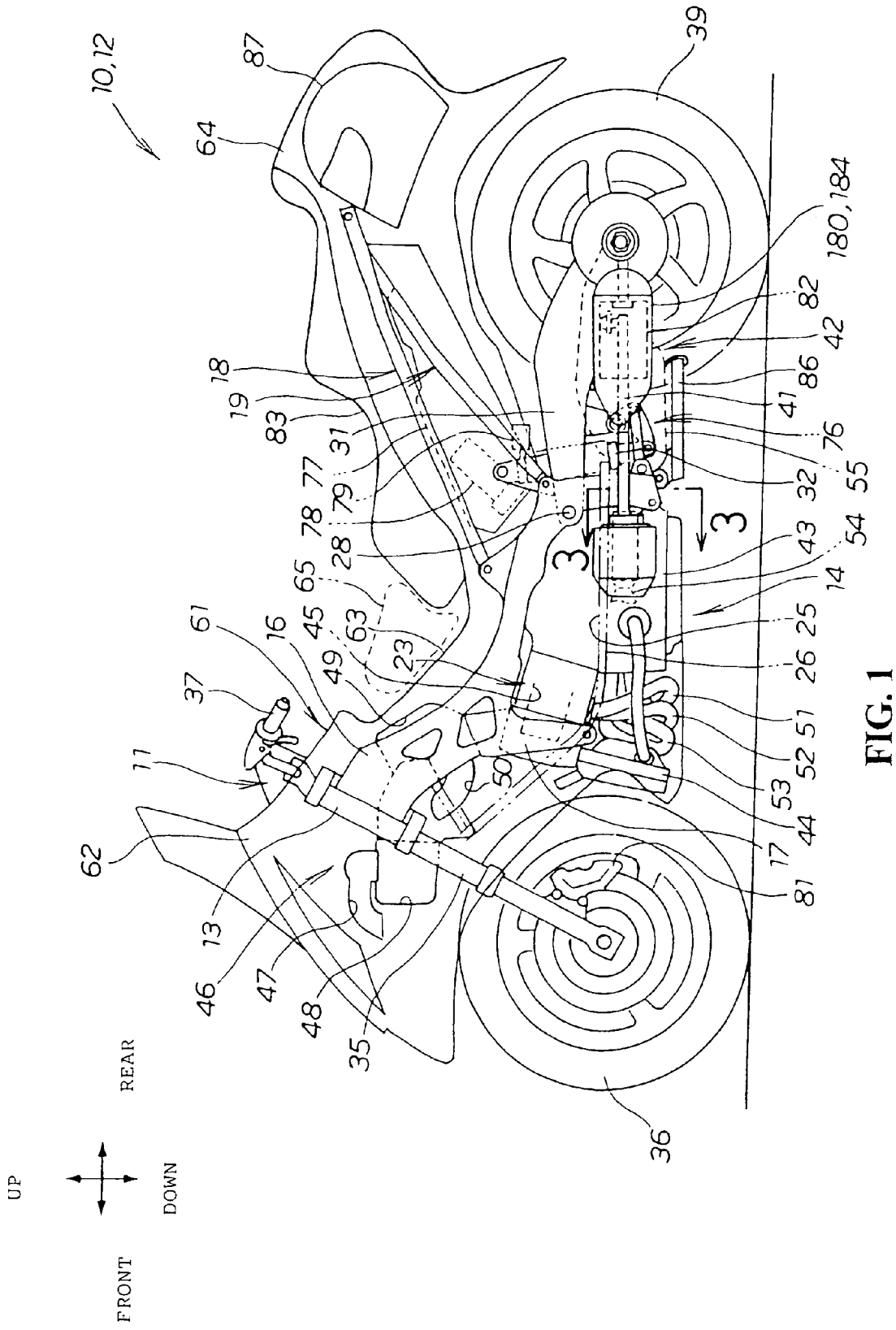
FIG. 1 is a left-side cross-sectional view of a low-floor type motorcycle according to the present invention.

Preferred embodiments of the present invention will be described below with reference to the accompanying drawings. Note that in the description the terms "front," "rear or back," "left," "right," "upside," and "downside" are denoted on the basis of the directions as viewed from the rider. In addition, the drawings should be looked according to the direction of the reference numerals.

FIG. 1 is a left-side cross-sectional view of a low-floor type motorcycle according to the present invention. A motorcycle 10 is provided with a body frame 11. This body frame 11 includes a head pipe 13; upper members 16, 16; seat rails 18, 18; support frames 19, 19; down members 17, 17; and floor brackets 26, 26 (only reference numerals on the left side are shown). The head pipe 13 is provided at the front end of the vehicle 12. The upper members 16, 16 extend from the head pipe 13, above the engine 14, and further toward the rearward. The seat rails 18, 18 extend from the upper members 16, 16 rearward and obliquely upward. The support frames 19, 19 support the seat rails 18, 18 from below. The down members 17, 17 branching from the corresponding upper members 16, 16 extend along the sides of a cylinder block 23 of the engine 14 and further downward. Likewise, the floor brackets 26, 26 extend from the upper portions of the upper members 16, 16 toward the backward to place step floors 25, 25 (only reference numeral 25 on the left side is shown) thereon.

A pivot shaft 28 is attached to the upper members 16, 16, and a rear swing arm 31 is connected to the pivot shaft 28 so as to be upwardly and downwardly swingable around the pivot shaft 28. In addition, a rear cushion unit 32 is spanned between the rear swing arm 31 and the body frame 11.

In the motorcycle 10, a front fork 35 is steerably joined to the head pipe 13, and a front wheel 36 is rotatably mounted to the lower end of the front fork 35. A steering handlebar 37 is attached to the upper portion of the front fork 35. The engine 14 is disposed in a space defined between the upper members 16 and the down members 17. A rear wheel 39 is rotatably mounted to the rear end of the rear swing arm 31. This vehicle has a power transmission mechanism 42 including a drive shaft 41 interposed between the engine 14 and the rear wheel 39 so as to drive the rear wheel 39.

In other words, the motorcycle 10 includes the body frame 11, the rear swing arm 31 swingably mounted on the body frame 11 through the pivot shaft 28, the engine 14 secured to the body frame 11, and the power transmission mechanism 42 for transmitting a driving force from the engine 14 via the drive shaft 41 to the rear wheel 39.

The main body of the engine 14 is composed of a crankcase 43 and a cylinder block 23 joined to the crankcase 43 so as to be tilted forward. The engine 14 is a water-cooled in-line three-cylinder engine. A radiator 44 is disposed below the cylinder block 23 and rearward of the front wheel 36.

The cylinder block 23 is provided with a cylinder part 45 having a cylindrical inner surface. The cylinder part 45 has three cylinders.

A description will be made of an air cleaner unit 46 constituting part of an air intake system.

The air intake system includes an air intake duct 47 provided forward of the head pipe 13, a first chamber 48 provided below the air intake duct 47, and a second chamber 49 provided rearward of the first chamber 48 via a connection duct 50. First, air taken through the air intake duct 47 is purified by an element, not shown, provided in the first chamber 48, and then the purified air is introduced into the second chamber 49 via the connection duct 50. Finally, the purified air is supplied to the engine 14 through the second chamber 49.

In this way, since the air cleaner unit 46 is disposed in front and rear of the head pipe 13, it can ensure sufficient capacity and can be disposed near the engine 14.

An exhaust system will be described. A first exhaust pipe 51, a second exhaust pipe 52, and a third exhaust pipe 53 are joined to the cylinder block 23 of the in-line three-cylinder engine 14. The first to third exhaust pipes 51 to 53 extend rearward and converge on a manifold part 54 located rearward of the exhaust pipes 51 to 53. In addition, a silencer 55 is disposed rearward of the manifold part 54.

A cover member 61 is a member for covering part of the vehicle 12 and serving as a cowl member. The cover member 61 includes a front cover member 62, an intermediate cover member 63, and a rear cover member 64. The front cover member 62 covers a front portion of the body frame 11 such as the head pipe 13. The intermediate cover member 63 is disposed rearward of the front cover member 62. The rear cover member 64 is disposed rearward of the intermediate cover member 63 so as to cover the rear portion of the vehicle 12.

The intermediate cover member 63 is formed with a leg-passing space 65 adapted to pass a rider's leg from above when the rider mounts on or dismounts from the vehicle, and is disposed above the engine 14. In other words, the engine 14 is disposed below the leg-passing space 65 adapted to pass a rider's leg when the rider mounts on or dismounts from the vehicle.

The step floors 25, 25 (only reference numeral 25 on the left side is shown) are members attached to the corresponding floor brackets 26, 26 serving as part of the body frame 11 and also are foot-placing parts adapted to place rider's feet thereon during running.

The plurality of exhaust pipes 51 to 53 are bundled together and disposed below the step floors 25.

A link mechanism 76 is interposed between the rear cushion unit 32 and the rear swing arm 31. FIG. 1 also illustrates a fuel tank 77, a fuel pump 78, a reservoir tank 79 of the rear cushion unit 21, a front brake unit 81, a universal joint 82 movable in an axial direction, a rider's seat 83, a main stand 86, and a helmet 87 housed in a storage space.

Figure 2:
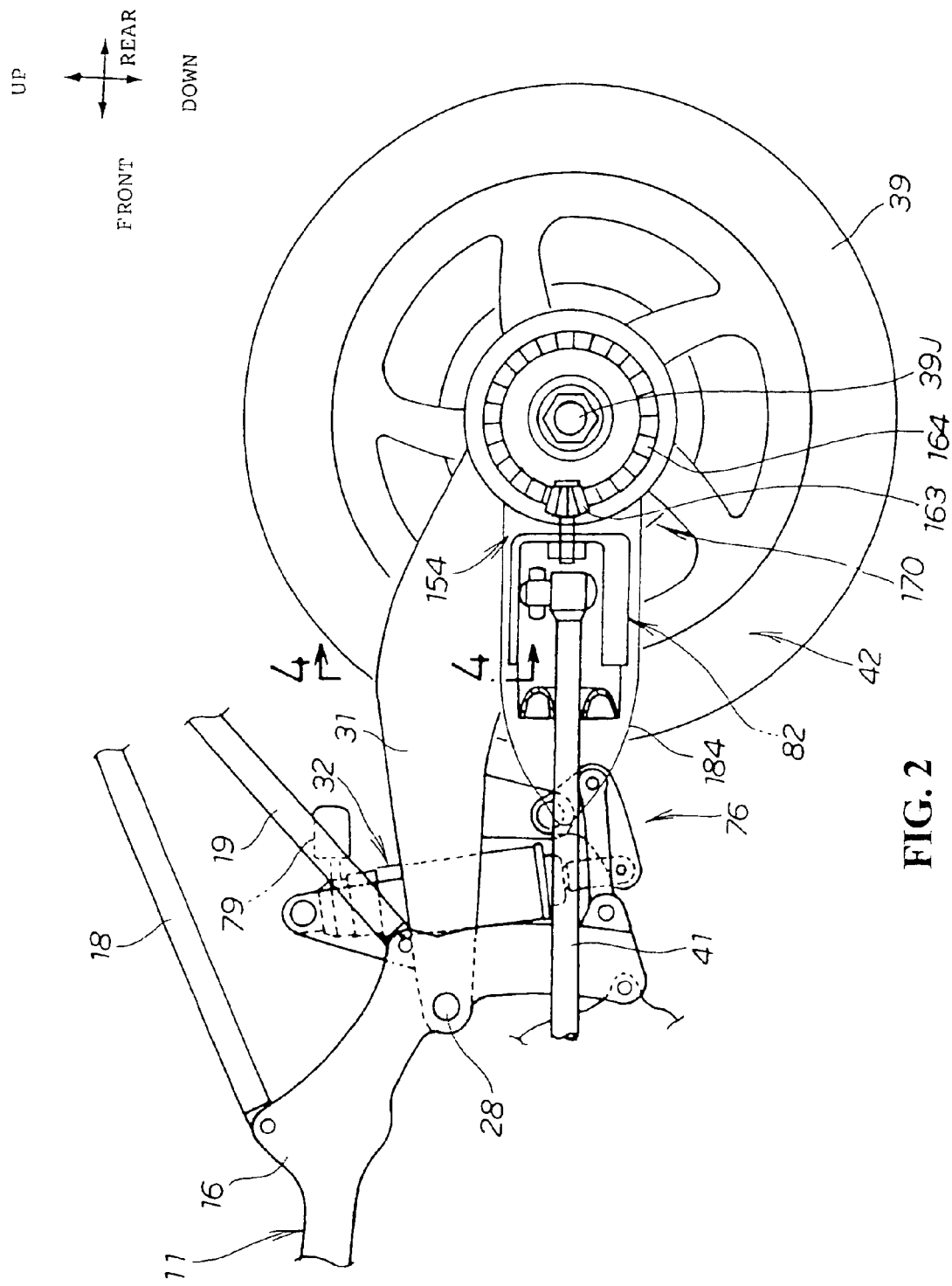
FIG. 2 is a schematic for illustrating a power transmission mechanism provided for the motorcycle according to the present invention.

FIG. 2 is a schematic view illustrating the power transmission mechanism provided for the low-floor type motorcycle according to the present invention. The power transmission mechanism 42 is disposed below and outside the rear swing arm 31 and transmits the power of the drive shaft 41 extending from an output shaft of the engine 14, to the rear wheel 39. In addition, the power transmission mechanism 42 includes a drive case 170 incorporating a transmission device which is disposed around an axle 39J of the rear wheel 39 and converts the direction of the driving force of the drive shaft 41 and transmits it to the rear wheel 39.

The drive shaft 41 constituting the power transmission mechanism 42 is disposed below the rear swing arm 31 and the pivot shaft 28.

In order to cover the drive shaft 41 and the universal joint 82 connected to the drive shaft 41, a drive shaft cover 184 is disposed forward of the drive case 170 and outside the universal joint 82.

In other words, the universal joint 82 is provided on the way of the drive shaft 41 so as to be slidable forwardly and backwardly. A drive shaft cover 184, which serves as a cover 180 (FIG. 1) for covering the universal joint 82, extends forward from the drive case 170.

The drive shaft cover 184 is a member having a C-sectional shape in which a portion of the inner side part of the vehicle body is cut away from a cylindrical member circular in section. Forming the drive shaft cover 184 into the C-sectional shape can facilitate the attachment/detachment thereof. Since the attachment/detachment of the drive shaft cover 184 can be facilitated, maintenance performance associated with the drive shaft 41 and its peripheral components can be enhanced.

The rear swing arm 31 is a bent frame being projected upward.

Since the rear swing arm 31 is a bent frame being projected upward, the bending rigidity of the rear swing arm 31 can be increased with ease. In addition, since the rear swing arm 31 is bent, it can be enhanced in external appearance.

The pivot shaft 28 is disposed above the drive shaft 41. The projected rear swing arm 31 extends rearward from the pivot shaft 28. The rear cushion unit 32 is connected at its lower end to the rear swing arm 31 via the link mechanism 76 and secured at its upper end to the body frame 11.

That is to say, the power transmission mechanism 42 includes the drive case 170 incorporating the transmission device 154 which is provided at the rear end of the rear swing arm 31, converts the direction of the driving force of the drive shaft 41 and transmits it to the rear wheel 39. The drive shaft 41 is disposed below the rear swing arm 31 and the pivot shaft 28.

In other words, the drive shaft 41 extends outside the body frame 11, the rear swing arm 31 is installed on the inside of the body frame 11, and the drive shaft 41 is disposed at a position offset from the pivot shaft 28 in the up and down direction.

In the present embodiment, the universal joint 82 connected to the drive shaft 41 is a constant velocity universal joint of a tripot type having a structure of being slidable in the axial direction of the drive shaft 41. The other universal joints having a slide structure may be applicable. In short, universal joints of any type, irrespective of nonconstant velocity type and constant velocity type, may be permissively applicable.

While disposed below and rearward of the pivot shaft 28 in the present embodiment, the universal joint 82 may be disposed forward of the pivot shaft 28.

Figure 3:
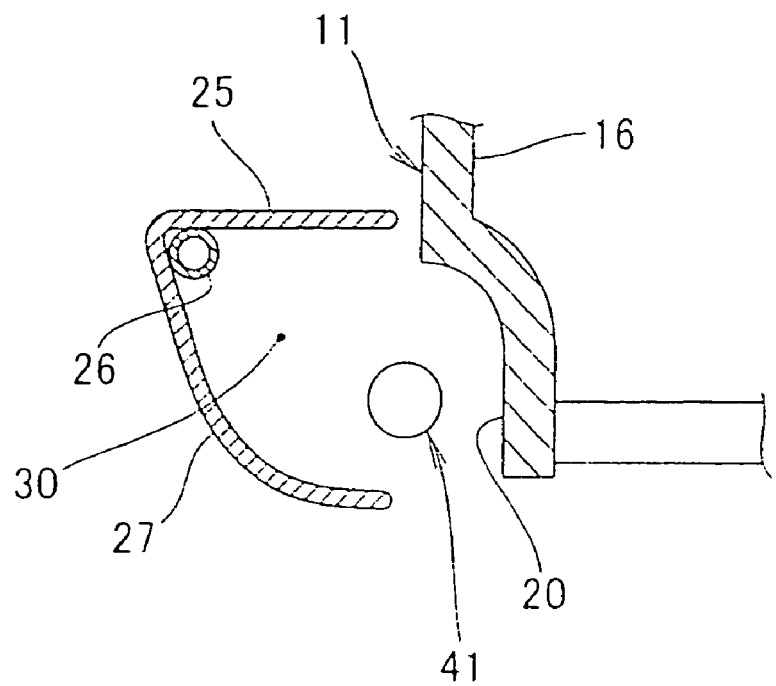
FIG. 3 is a cross-sectional view taken along line 3-3 of FIG. 1.

FIG. 3 is a cross-sectional view taken along line 3-3 of FIG. 1. The drive shaft 41 passes through a space 30 enclosed by a recessed part 20 provided at the lower end of the upper member 16 constituting part of the body frame 11, the step floor 25 provide on the floor bracket 26, and the under cover 27 provided outward of the step floor 25.

In other words, the drive shaft 41 passes through the space 30 enclosed by the body frame 11, the step floor 25 adapted to place a rider's foot thereon, and the under cover 27 contiguous to the step floor 25 and extending downward from the step floor 25.

Since the drive shaft 41 is configured to pass through the space 30, while ensuring the space adapted to place a rider's foot thereon, a space below this space can be utilized effectively.

Incidentally, while formed in a single-piece in the present embodiment, the step floor and the under cover may be formed separately from each other.

The step floor 25 (see FIG. 1) is disposed above the drive shaft 41. Since the drive shaft 41 extends below the pivot shaft 28, the drive shaft 41 can be located at a relatively lower position. This relatively low position of the drive shaft 41 allows the step floor to be located effectively. The transmission device will be detailed later.

Figure 4:
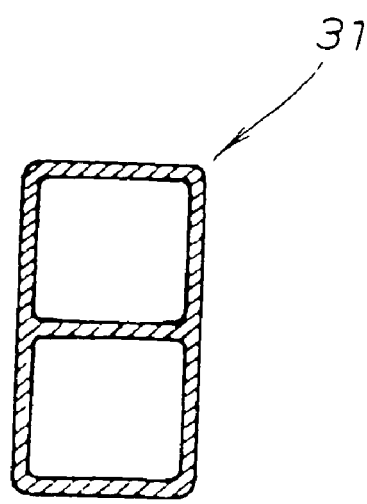
FIG. 4 is a cross-sectional view taken along line 4-4 of FIG. 2.

FIG. 4 is a cross-sectional view of the rear swing arm 31 taken along line 4-4 of FIG. 2.

The rear swing arm 31 is not of a rectangle in section usually and frequently used but is of a double-rectangle in section; therefore, the modulus of section can be increased. The increased modulus of section can increase the bending rigidity of the rear swing arm 31.

Incidentally, the sectional shape is not limited to the double-rectangle, and for example, the triple-rectangle may be applicable.

Figure 5:
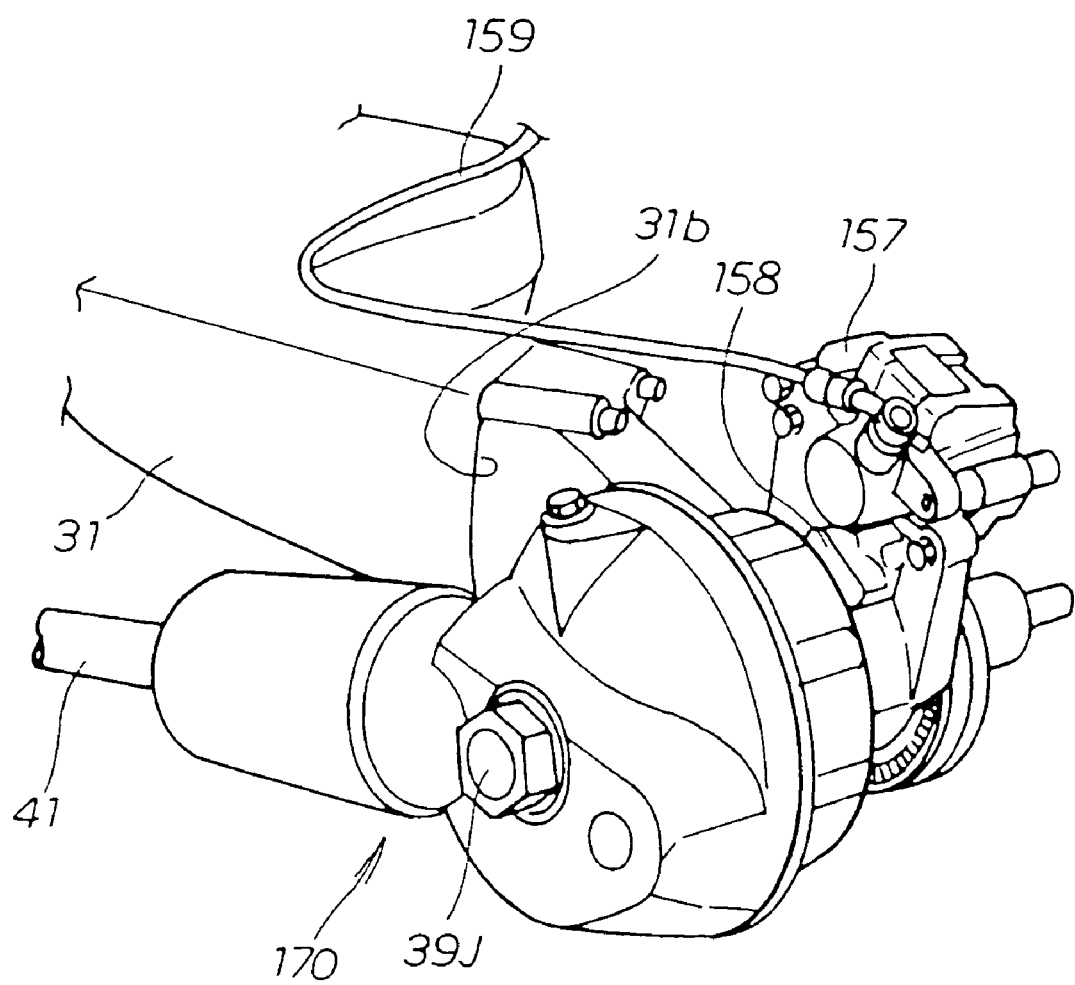
FIG. 5 is a perspective view for illustrating the power transmission mechanism provided for the motorcycle according to the present invention.

FIG. 5 is a perspective view illustrating the power transmission mechanism provided in the low-floor type motorcycle according to the present invention. This power transmission mechanism includes the axle 39j of the rear wheel 39 and the drive case 170 surrounding the axle 39j. The rear end 31b of the rear swing arm 31 is connected to the drive case 170 and a rear brake unit 157 is axially attached to the drive case 170. In addition, for example, a wheel-speed sensor 158 for an ABS (Antilock Braking System) is attached to part of the rear brake unit 157. Reference numeral 159 denotes a brake pipe.

Figures 6A, 6B:
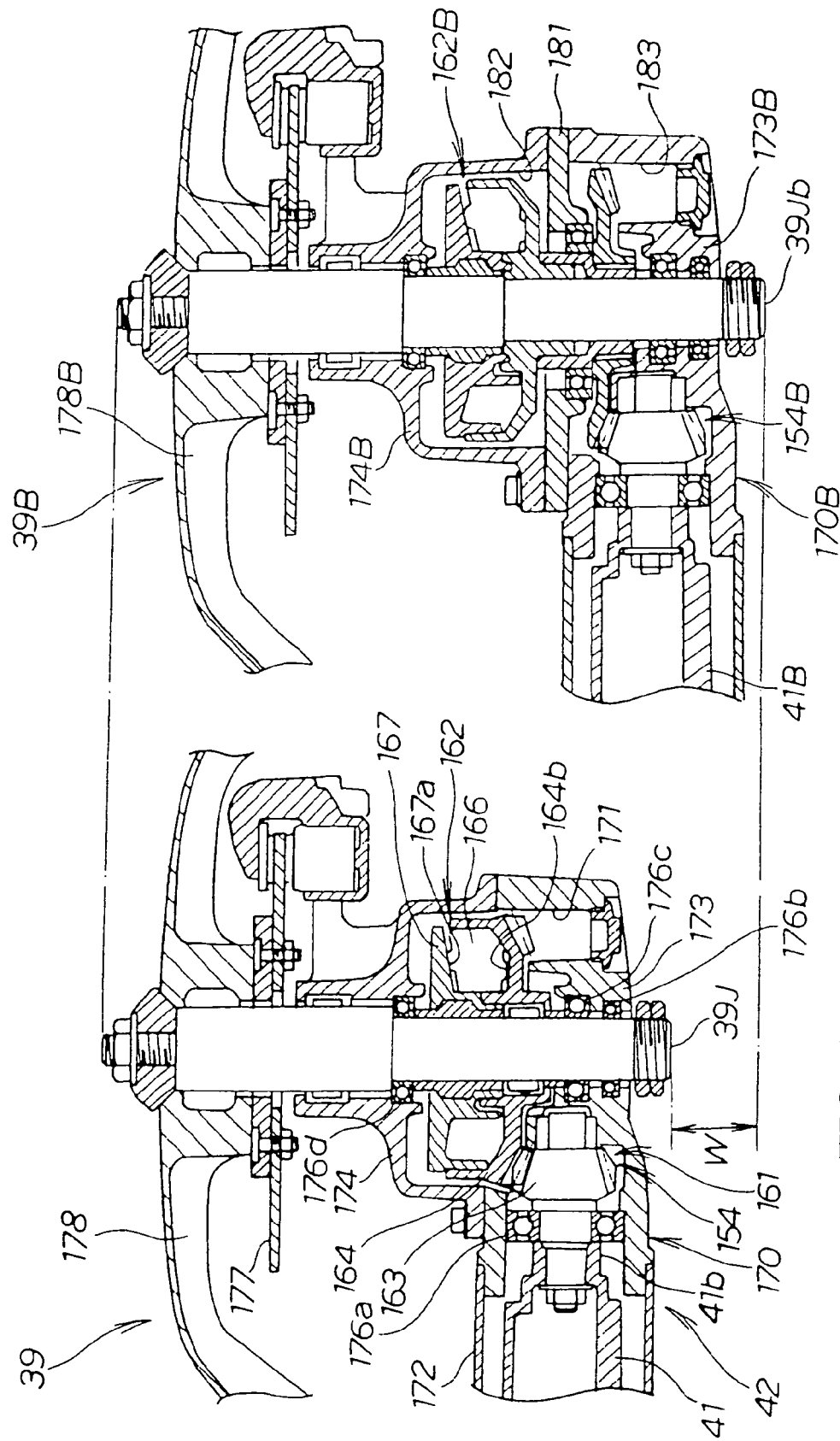
FIGS. 6(a) and 6(b) are cross-sectional views for illustrating the power transmission mechanism provided for the motorcycle according to the present invention.

FIGS. 6(*a*) and 6(*b*) are cross-sectional views for illustrating the power transmission mechanism included in the low-floor type motorcycle according to the present invention.

FIG. 6(*a*) illustrates the embodiment. In the figure, the power transmission mechanism 42 includes a drive shaft 41 and the drive case 170 incorporating the transmission device 154 which converts the direction of a driving force of the drive shaft 41 and transmits it to the rear wheel 39. The driving device 154 has a pair of final gear sets 161 which converts the direction of a driving force. A damping device 162 includes a damping member 166 which is interposed between the final gear set 161 and the axle 39j of the rear wheel 39 to alleviate a shock resulting from torque variations.

The configuration of the power transmission mechanism will be detailed. The final gear sets 161 include a first final gear 163 and a second final gear 164. The first final gear 163 is coupled to the rear end 41b of the drive shaft 41. The second final gear 164 is meshed with the first final gear 163 and the second final gear 164 is rotatably disposed coaxially with the axle 39j of the rear wheel.

The damping device 162 is composed of the damping member 166 and the damper holder 167. The damping member 166 is disposed on a rear face 164b of the second final gear 164. A disklike damper holder 167 secured to the axle 39J of the rear wheel 39 is provided for the damping member 166. The damping member 166 is held between the rear surface 164b of the second final gear 164 and the front surface 167a of the damper holder 167. With this configuration, the driving force of the drive shaft 41 is transmitted to the axle 39j of the rear wheel 39 while alleviating a shock resulting from the torque variations of the drive shaft 41.

The drive case 170 covering the power transmission mechanism 42 covers the damping device 162 and the transmission device 154 and includes a damper case 174 and a gear case 173. A driving chamber 171 incorporating the damper device 162 and the transmission device 154 is formed inside such cases 173, 174. Oil is filled in the driving chamber 171.

A shaft case 172, which is a member disposed forward of the gear case 173, covers the drive shaft 41. Also shown are bearings 176a to 176d, a rear disk brake plate 177, and a wheel 178 of the rear wheel 39.

That is to say, the drive case 170 incorporating the transmission device 154 which converts the direction of the driving force of the drive shaft 41 and transmits it to the rear wheel 39 is provided at the rear end 31b of the rear swing arm 31. The damping device 162 which alleviates a shock applied to the rear wheel 39 is provided in the drive case 170. The damping member 166 is provided in the damping device 162 so as to be coaxial with the axle 39J of the rear wheel 39.

FIG. 6(*b*) illustrates another embodiment, which is to be described while focusing on a major difference from the embodiment shown in FIG. 6(*a*).

A drive case 170B covering the transmission device 154B includes a damper case 174B, a lid member 181, and a gear case 173B. The damper case 174B is provided at the almost-central portion of an axle 39JB of a rear wheel 39B so as to cover a damper device 162b. The lid member 181 is provided for the damper case 174B with respect to the axial direction of the rear wheel 39B and on the drive shaft 41B side so as to close the damper case 174B. The gear case 173B covers the transmission device 154B from the outside of the lid member 181.

The drive case 170B includes the damper case 174B, the lid member 181, and the gear case 173B. A damper chamber 182 incorporating the damping device 162B is formed on the inside of the damper case 174B. A gear chamber 183 incorporating the transmission device 154B is formed on the inside of the transmission device 154B. Oil is filled in the damper chamber 182 and the gear chamber 183.

In this way, the damper chamber 182 is provided on the side of the wheel 178B of the rear wheel 39B and the gear chamber 183 is provided independently of the damper chamber 182.

A comparison will be made between the length of the axle 39J of the rear wheel 39 shown in FIG. 6(*a*) and that of the axle 39Jb of the rear wheel 39B shown in FIG. 6(*b*).

Since the driving chamber 171 incorporating the transmission device 154 and the damper device 162 is provided inside the drive case 170 in FIG. 6(*a*), the length of the axle in FIG. 6(*a*) can be made shorter by length W than that of the axle in FIG. 6(*b*).

Since the transmission device 154 and the damping device 162 are incorporated in the drive case 170, they can be integrated in a single chamber. For example, it is not necessary to provide a partition wall between the transmission device 154 and the damper 162 so as to separate them.

Where the damping member 166 is provided in the damping device 162 so as to be coaxial with the axle 39J of the rear wheel 39, if a partition wall which separates the transmission device 154 from the damper device 162 is not necessary, the length of the axle 39J of the rear wheel 39 can be reduced. If the length of the axle 39J of the rear wheel 39 can be reduced, the width of the vehicle 12 can be minimized.

In addition, this configuration can reduce the size of the shaft case 172 as compared with the case where the damping member 166 is attached to the shaft case 172 covering the drive shaft 41.

A description will be next made of the function of the low-floor type motorcycle described thus far.

Referring again to FIG. 2, since the drive shaft 41 is disposed below the rear swing arm 31 and the pivot shaft 28, it need not be disposed on the side of the pivot shaft 28.

When the drive shaft 41 is disposed on the side of the pivot shaft 28, the vehicle may need at least a width of the pivot shaft 28 plus the outside diameter of the drive shaft 41, thereby probably increasing the width of the vehicle.

On this point, since the drive shaft 41 is disposed below the pivot shaft 28 in the present invention, it becomes possible to dispose the drive shaft 41 and the pivot shaft 28 so as to overlap each other as viewed from above. If the drive shaft 41 and the pivot shaft 28 are disposed to overlap each other as viewed from above, the width of the rear swing arm 31 can be suppressed. If the width of the rear swing arm 31 can be suppressed, the width of the vehicle can be suppressed.

In addition, since the drive shaft 41 is disposed below the rear swing arm 31, the power take-out section can be disposed below the rear swing arm 31. The arrangement of the power take-out section below the rear swing arm 31 makes it possible to dispose the engine 14 (see FIG. 1) at a lower portion of the vehicle 12. Thus, it is possible to lower the center of gravity of the vehicle. Lowering the center of gravity of the vehicle can enhance drivability during running at high-speeds.

In addition, the engine 14 is disposed below the leg-passing space 65 adapted to pass a rider's leg therethrough when the rider mounts on or dismounts from the vehicle. Therefore, the engine can be disposed at a lower portion of the vehicle. Since the engine can be disposed at a lower portion of the vehicle, it is possible to lower the center of gravity of the vehicle. In addition, since the leg-passing space can be ensured widely, driver's mount/dismount performance can be enhanced.

Further, the drive shaft 41 extends outside the body frame 11, the rear swing arm 31 is attached to the inside of the body frame 11, and the drive shaft 41 is extended to a position offset from the pivot shaft 28 upwardly or downwardly as viewed from the side. Therefore, the width of the vehicle can be suppressed. In addition, the degree of freedom of designing the body frame 11 can be enhanced.

In addition, displacing the position of the drive shaft 41 upward or downward makes it possible to dispose the engine 14 (see FIG. 1) at an optimum position.

The present invention is suitable for the motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle comprising:
    a body frame;
    a rear swing arm swingably attached to the body frame via a pivot shaft;
    an engine secured to the body frame; and
    a power transmission mechanism including a drive shaft which transmits a driving force from the engine to a rear wheel;
    wherein the drive shaft is disposed below the rear swing arm and the pivot shaft, the drive shaft being adapted to swing together with the rear swing arm, and
    wherein the power transmission mechanism includes
        a universal joint at a rear end of the drive shaft, so that the drive shaft and the universal joint are capable of sliding forwardly and rearwardly in an axial direction with respect to each other, and
        a cover covering the universal joint, the cover extending forwardly from a drive case incorporating the power transmission mechanism.

2. The motorcycle according to claim 1, wherein the rear swing arm is a bent frame with a bent part projecting upwardly.

3. The motorcycle according to claim 1, wherein the engine is disposed below a leg-passing space adapted to pass a rider's leg therethrough when a rider mounts on or dismounts from the motorcycle.

4. The motorcycle according to claim 1, wherein the power transmission mechanism is configured such that the drive shaft extends through a space enclosed by the body frame, a step floor on which a driver's foot is placed, and an under cover merging into the step floor and extending below the step floor.

5. The motorcycle according to claim 1, wherein the drive shaft extends outside the body frame, the rear swing arm is installed on an inside of the body frame, and the drive shaft is disposed at a position offset from the pivot shaft in an up and down direction.

6. The motorcycle according to claim 1, wherein a front end portion of the drive shaft located directly rearward of a crankcase is exposed and is surrounded only by the body frame and an undercover merging into and extending below a step floor.

7. The motorcycle according to claim 1, wherein the rear swing arm has a sectional shape including two or more rectangles that are arranged one above another.

8. A motorcycle comprising:
    a body frame;
    a rear swing arm swingably attached to the body frame via a pivot shaft;
    an engine secured to the body frame; and
    a power transmission mechanism including a drive shaft which transmits a driving force from the engine to a rear wheel;
    wherein the drive shaft extends outside the body frame and the rear swing arm is attached to an inside of the body frame,
    the drive shaft is disposed at a position offset from the pivot shaft in the up and down direction as viewed from the side, and
    the drive shaft being adapted to swing together with the rear swing arm,
    wherein the power transmission mechanism includes
        a universal joint at a rear end of the drive shaft, so that the drive shaft and the universal joint are capable of sliding forwardly and rearwardly in an axial direction with respect to each other, and
        a cover covering the universal joint, the cover extending forwardly from a drive case incorporating the power transmission mechanism.

9. The motorcycle according to claim 8, wherein the rear swing arm is a bent frame with a bent part projecting upwardly.

10. The motorcycle according to claim 8, wherein the engine is disposed below a leg-passing space adapted to pass a rider's leg therethrough when a rider mounts on or dismounts from the motorcycle.

11. The motorcycle according to claim 8, wherein the power transmission mechanism is configured such that the drive shaft extends through a space enclosed by the body frame, a step floor on which a driver's foot is placed, and an under cover merging into the step floor and extending below the step floor.

12. The motorcycle according to claim 8, wherein the rear swing arm has a sectional shape including two or more rectangles that are arranged one above another.

13. The motorcycle according to claim 8, wherein a front end portion of the drive shaft located directly rearward of a crankcase is exposed and is surrounded only by the body frame and an undercover merging into and extending below a step floor.

14. A motorcycle comprising:
a body frame;
a rear swing arm swingably attached to the body frame via a pivot shaft;
an engine secured to the body frame; and
a power transmission mechanism which transmits a driving force from the engine to a rear wheel via a drive shaft and a damping device;
wherein the power transmission mechanism is configured such that:
a drive case incorporating a transmission mechanism is provided at a rear end of the rear swing arm, the transmission mechanism converting a direction of a driving force of the drive shaft and transmitting the driving force to the rear wheel;
the damping device which alleviates a shock applied to the rear wheel is provided in the drive case; and
a damping member is provided in the damping device so as to be coaxial with an axle of the rear wheel,
wherein the drive shaft is adapted to swing together with the rear swing arm, and
wherein the power transmission mechanism includes
a universal joint at a rear end of the drive shaft, so that the drive shaft and the universal joint are capable of sliding forwardly and rearwardly in an axial direction with respect to each other, and
a cover covering the universal joint, the cover extending forwardly from a drive case incorporating the power transmission mechanism.

15. The motorcycle according to claim 14, wherein the rear swing arm is a bent frame with a bent part projecting upwardly.

16. The motorcycle according to claim 14, wherein the engine is disposed below a leg-passing space adapted to pass a rider's leg therethrough when a rider mounts on or dismounts from the motorcycle.

17. The motorcycle according to claim 14, wherein the rear swing arm has a sectional shape including two or more rectangles that are arranged one above another.

18. The motorcycle according to claim 14, wherein no portion of the drive shaft extending forward of the cover covering the universal joint is connected to any portion of the rear swing arm.

19. The motorcycle according to claim 14, wherein the power transmission mechanism is configured such that the drive shaft extends through a space enclosed by a recessed part provided at a lower end of an upper member constituting part of the body frame, a step floor on which a driver's foot is placed, and an under cover merging into the step floor and extending below the step floor.

20. The motorcycle according to claim 14, wherein the drive case provides a single chamber for housing a transmission device of the power transmission mechanism and the damping member of the damping device.

* * * * *